United States Patent [19]
Paik et al.

[11] Patent Number: 5,321,725
[45] Date of Patent: Jun. 14, 1994

[54] METHOD AND APPARATUS FOR COMMUNICATING DIGITAL INFORMATION SUCH AS COMPRESSED VIDEO USING TREILLIS CODED QAM

[75] Inventors: Woo H. Paik, Encinitas; Scott A. Lery, Leucadia, both of Calif.; Chris Heegard, Ithaca, N.Y.; Edward A. Krause, San Diego; Jerrold A. Heller, Del Mar, both of Calif.

[73] Assignee: General Instrument Corporation, Hatboro, Pa.

[21] Appl. No.: 908,407

[22] Filed: Jul. 10, 1992

Related U.S. Application Data

[63] Continuation-in-part of Ser. No. 736,738, Jul. 26, 1991, Pat. No. 5,233,629.

[51] Int. Cl.⁵ .............................................. H04L 5/12
[52] U.S. Cl. ............................... 375/39; 375/94; 371/37.5; 371/43; 348/384; 348/155
[58] Field of Search ............... 375/38, 39, 40, 62, 375/79, 83, 94; 371/37.1, 37.4, 37.5, 43; 358/133, 105, 135; 332/103; 329/304

[56] References Cited

U.S. PATENT DOCUMENTS

| | | |
|---|---|---|
| 4,483,012 | 11/1984 | Wei . |
| 4,586,182 | 4/1986 | Gallager . |
| 4,660,214 | 4/1987 | Pahlavan et al. . |
| 5,054,036 | 10/1991 | Brownlie et al. . |
| 5,115,453 | 5/1992 | Calderbank et al. . |
| 5,901,782 | 2/1992 | Krause et al. .......... 358/105 |

OTHER PUBLICATIONS

Viterbi, et al., "A Pragmatic Approach to Trellis-Coded Modulation," *IEEE Communications Magazine*, Jul. 1989, pp. 11–19.

Odenwalder, J. P., *Error Control Coding Handbook*, Section 7.1, "Viterbi-Decoded Convolutional Inner Code and Reed-Solomon Outer Code," Linkabit Corporation, 1976.

W. Paik, "DigiCipher—All Digital, Channel Compatible, HDTV Broadcast System," *IEEE Transactions on Broadcasting*, vol. 36, No. 4, Dec. 1990, pp. 245–254.

*Primary Examiner*—Stephen Chin
*Assistant Examiner*—Hai H. Phan
*Attorney, Agent, or Firm*—Barry R. Lipsitz

[57] ABSTRACT

A method and apparatus for communicating high definition television signals is provided. Video signals are divided into blocks of PCM data. The PCM data is processed using motion estimation and compensation to provide DPCM data. For each block, one of PCM and DPCM data is selected for transmission based on a predetermined criteria. The selected data is compressed using the discrete cosine transform to provide blocks of transform coefficients. The coefficients are quantized to improve their coding efficiency and variable length coded. The variable length coded coefficients are coded using a concatenated coding scheme with a Reed-Solomon outer code and trellis inner code to provide coded signals for transmission. The coded signals are transmitted using QAM.

17 Claims, 9 Drawing Sheets

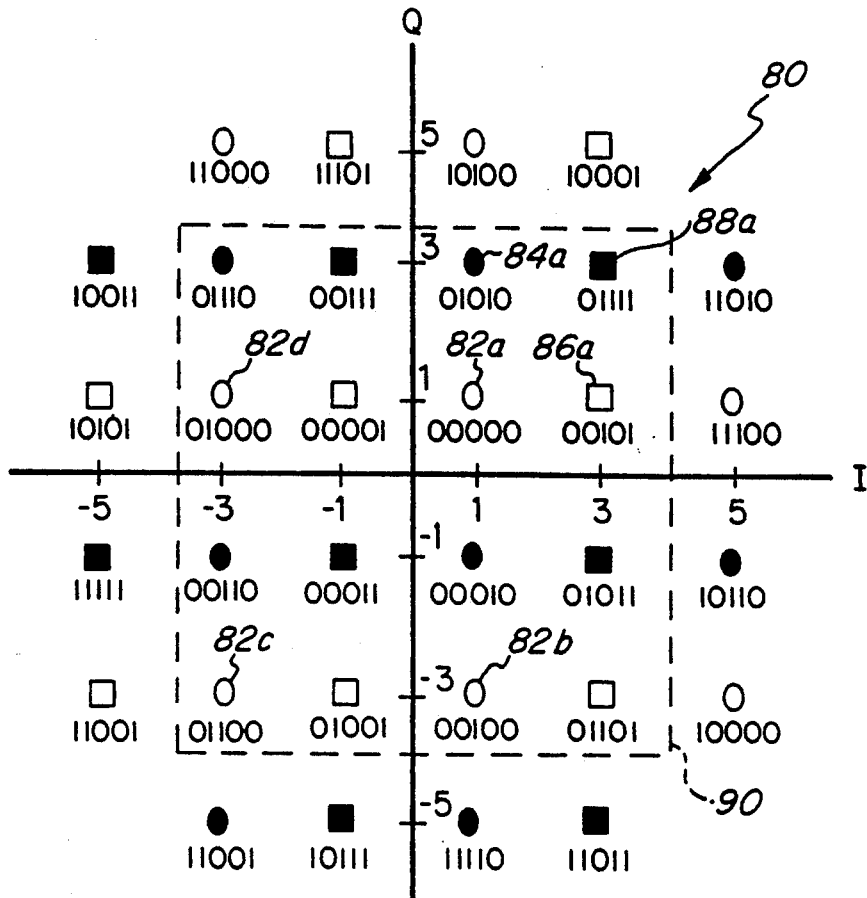
FIG. 4
| SUBSET LABELING | | | |
|---|---|---|---|
| SUBSET | BINARY LABEL m1 m0 | HAMMING WEIGHT | EUCLIDIAN WEIGHT/4 |
| 82 ○ | 0 0 | 0 | 0 |
| 84 ● | 1 0 | 1 | 1 |
| 86 □ | 0 1 | 1 | 1 |
| 88 ■ | 1 1 | 2 | 2 |
FIG. 5
CONSTELLATION LABELING
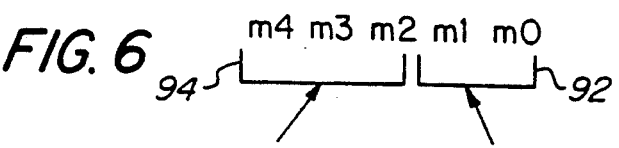
FIG. 6
SIGNAL SELECT (UNCODED BITS)   SUBSET SELECT (CODED BITS)

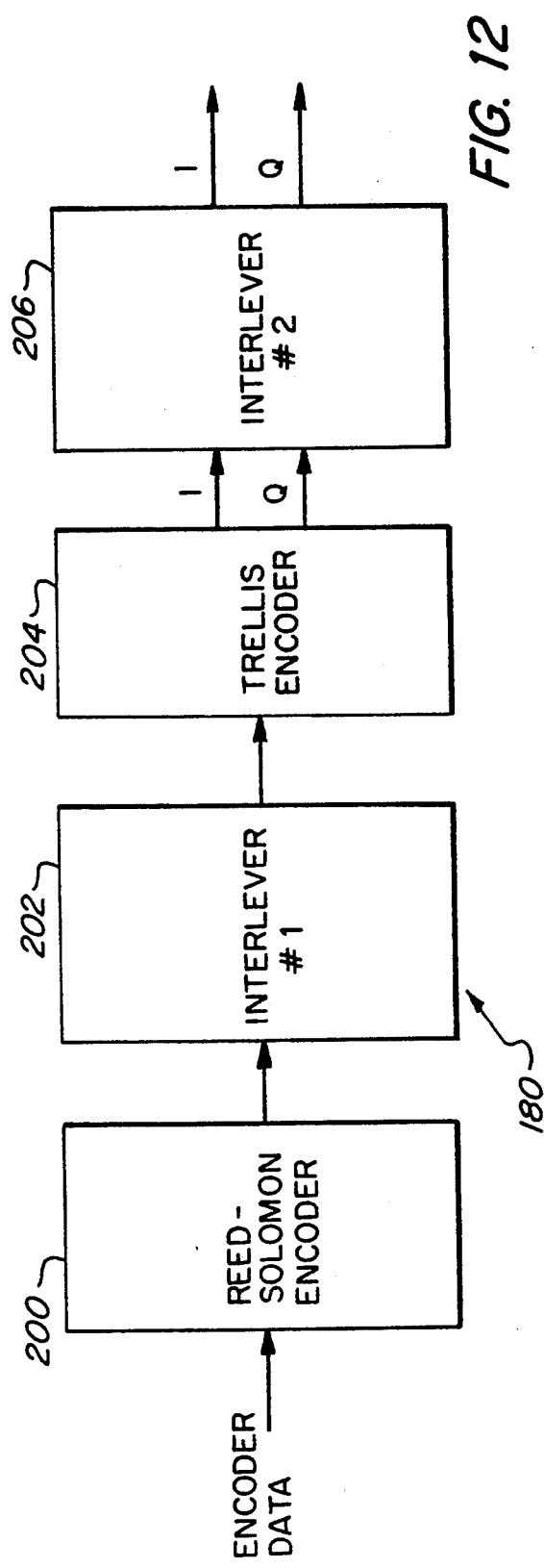
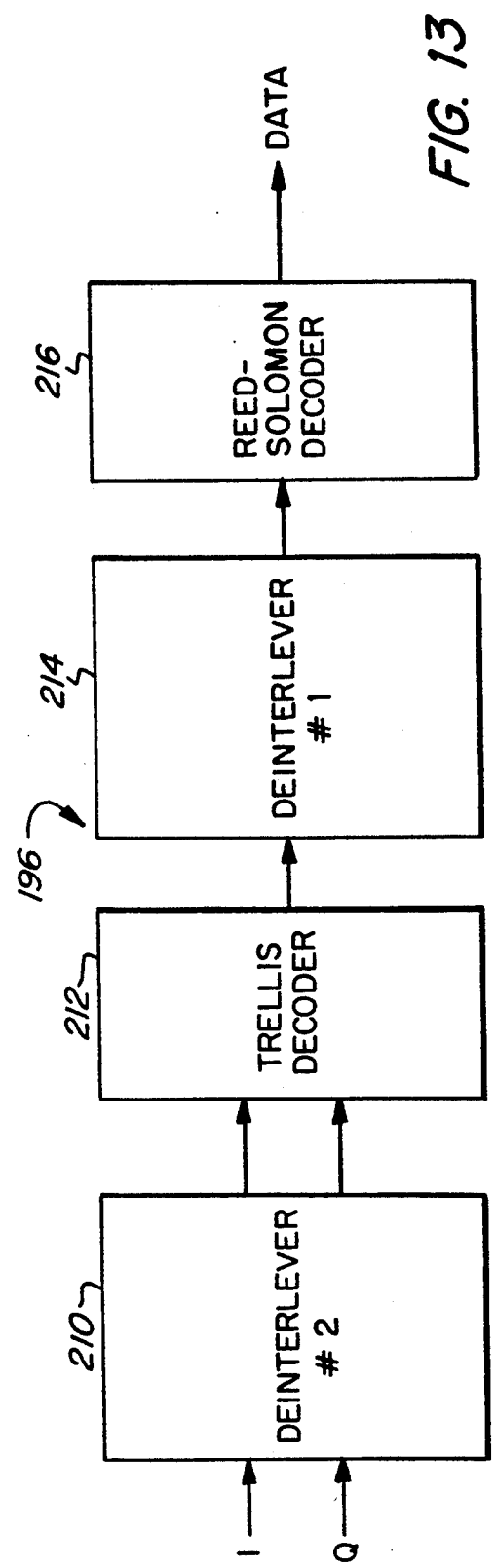
FIG. 12
FIG. 13

METHOD AND APPARATUS FOR COMMUNICATING DIGITAL INFORMATION SUCH AS COMPRESSED VIDEO USING TREILLIS CODED QAM

This application is a continuation-in-part of U.S. patent application Ser. No. 07/736,738, filed Jul. 26, 1991, now U.S. Pat. No. 5,233,629, issued Aug. 3, 1993.

BACKGROUND OF THE INVENTION

The present invention relates to trellis coded quadrature amplitude modulation (QAM) and more particularly to a practical method for coding QAM transmission. The invention is particularly applicable to the transmission of compressed video information in a high definition television (HDTV) system.

Digital data, for example digitized video for use in broadcasting high definition television signals, can be transmitted over terrestrial VHF or UHF analog channels for communication to end users. Analog channels deliver corrupted and transformed versions of their input waveforms. Corruption of the waveform, usually statistical, may be additive and/or multiplicative, because of possible background thermal noise, impulse noise, and fades. Transformations performed by the channel are frequency translation, nonlinear or harmonic distortion and time dispersion.

In order to communicate digital data via an analog channel, the data is modulated using, for example, a form of pulse amplitude modulation (PAM). Typically, quadrature amplitude modulation (QAM) is used to increase the amount of data that can be transmitted within an available channel bandwidth. QAM is a form of PAM in which a plurality of bits of information are transmitted together in a pattern referred to as a "constellation" that can contain, for example, sixteen or thirty-two points.

In pulse amplitude modulation, each signal is a pulse whose amplitude level is determined by a transmitted symbol. In 16-bit QAM, symbol amplitudes of $-3, -1, 1$ and $3$ in each quadrature channel are typically used. In 32-QAM, symbol amplitudes of $-5, -3, -1, 1, 3$ and $5$ are typically used. Bandwidth efficiency in digital communication systems is defined as the number of transmitted bits per second per unit of bandwidth, i.e., the ratio of the data rate to the bandwidth. Modulation systems with high bandwidth efficiency are employed in applications that have high data rates and small bandwidth occupancy requirements. QAM provides bandwidth efficient modulation.

On the other hand, modulation schemes such as quadrature phase shift keying (QPSK), commonly found in satellite transmission systems, are well established and understood. In QPSK, a more simple constellation pattern than that provided in QAM results. In particular, QPSK systems use a constellation pattern having only four symbols that are typically positioned 90 degrees apart from each other in phase, but have the same amplitude. Thus, the four symbols are equally spaced about a circle.

QPSK modulation is suitable for power limited systems where bandwidth limitations are not a major concern. QAM modulation, on the other hand, is advantageous in bandwidth limited systems, where power requirements do not present a major problem. Therefore, QPSK has been the system of choice in satellite communication systems, whereas QAM is preferred in terrestrial and cable systems. As a consequence of the popularity of QPSK, integrated circuits that realize trellis coded QPSK modulation are readily available and easily obtained.

Trellis coded modulation (TCM) has evolved as a combined coding and modulation technique for digital transmission over band limited channels. It allows the achievement of significant coding gains over conventional uncoded multilevel modulation, such as QAM, without compromising bandwidth efficiency. TCM schemes utilize redundant nonbinary modulation in combination with a finite-state encoder which governs the selection of modulation signals to generate coded signal sequences. In the receiver, the noisy signals are decoded by a soft-decision maximum likelihood sequence decoder. Such schemes can improve the robustness of digital transmission against additive noise by 3–6 dB or more, compared to conventional uncoded modulation. These gains are obtained without bandwidth expansion or reduction of the effective information rate as required by other known error correction schemes. The term "trellis" is used because these schemes can be described by a state-transition (trellis) diagram similar to the trellis diagrams of binary convolutional codes. The difference is that TCM extends the principles of convolutional coding to nonbinary modulation with signal sets of arbitrary size.

The availability of components for implementing trellis coded QPSK modulation is a significant advantage in designing low cost communication systems for applications, such as satellite communications, wherein QPSK techniques excel. However, such components have not been of assistance in implementing other coded transmission systems, such as those in which QAM is preferred.

For applications that are both power limited and band limited, and require low cost components (particularly low cost data decoders), conventional QAM systems have not been feasible due to the complexity and relatively high cost of the required encoder and decoder circuits. In fact, it is typical to implement QAM trellis encoders and decoders in expensive custom integrated circuit chips.

One power limited and band limited application in which a low cost solution is necessary for communicating digital data is the digital communication of compressed high definition television signals. Systems for transmitting compressed HDTV signals have data rate requirements on the order of 15–20 megabits per second (Mbps), bandwidth occupancy requirements on the order of 5–6 MHz (the bandwidth of a conventional National Television System Committee (NTSC) television channel), and very high data reliability requirements (i.e., a very small bit error rate). The data rate requirement arises from the need to provide a high quality compressed television picture. The bandwidth constraint is a consequence of the U.S. Federal Communications Commission requirement that HDTV signals occupy existing 6 MHz television channels, and must coexist with the current broadcast NTSC signals. To achieve full HDTV performance in a single six MHz bandwidth, a highly efficient, unique compression algorithm based on DCT transform coding has been proposed by W. Paik, "Digicipher—All Digital, Channel Compatible, HDTV Broadcast System," *IEEE Transactions on Broadcasting*, Vol. 36, No. 4, December 1990, pp. 245–254, incorporated herein by reference.

This combination of data rate and bandwidth occupancy requires a modulation system that has high bandwidth efficiency. Indeed, the ratio of data rate to bandwidth must be on the order of 3 or 4. This means that modulation systems such as QPSK, having a bandwidth efficiency without coding of two, are unsuitable. A more bandwidth efficient modulation, such as QAM is required. However, as noted above, QAM systems have been too expensive to implement for high volume consumer applications.

The requirement for a very high data reliability in the HDTV application results from the fact that highly compressed source material (i.e., the compressed video) is intolerant of channel errors. The natural redundancy of the signal has been removed in order to obtain a concise description of the intrinsic value of the data. For example, for a system to transmit at 15 Mbps for a twenty-four hour period, with less than one bit error, requires the bit error rate (BER) of the system to be less than one error in $10^{12}$ transmitted bits.

Data reliability requirements are often met in practice via the use of a concatenated coding approach, which is a divide and concur approach to problem solving. In such a coding framework, two codes are employed. An "inner" modulation code cleans up the channel and delivers a modest symbol error rate to an "outer" decoder. The inner code is usually a coded modulation that can be effectively decoded using "soft decisions" (i.e., finely quantized channel data). A known approach is to use a convolutional or trellis code as the inner code with some form of the "Viterbi algorithm" as a trellis decoder. The outer code is most often a t-error-correcting, "Reed-Solomon" code. Such Reed-Solomon coding systems, that operate in the data rate range required for communicating HDTV data, are widely available and have been implemented in the integrated circuits of several vendors. The outer decoder removes the vast majority of symbol errors that have eluded the inner decoder in such a way that the final output error rate is extremely small.

A more detailed explanation of concatenated coding schemes can be found in G. C. Clark, Jr. and J. B. Cain, "Error-Correction Coding for Digital Communications", Plenum Press, New York, 1981; and S. Lin and D. J. Costello, Jr., "Error Control Coding: Fundamentals and Applications", Prentice-Hall, Englewood Cliffs, N.J., 1983. Trellis coding is discussed extensively in G. Ungerboeck, "Channel Coding with Multilevel/Phase Signals", *IEEE Transactions on Information Theory*, Vol. IT-28, No. 1, pp. 55-67, January, 1982; G. Ungerboeck, "Trellis-Coded Modulation with Redundant Signal Sets—Part I: Introduction,—Part II: State of the Art", *IEEE Communications Magazine*, Vol. 25, No. 2, pp. 5-21, February, 1987; and A. R. Caulderbank and N. J. A. Sloane, "New Trellis Codes Based on Lattices and Cosets", *IEEE Transactions on Information Theory*, Vol. IT-33, No. 2, pp. 177-195, March, 1987. The Viterbi algorithm is explained in G. D. Forney, Jr., "The Viterbi Algorithm", *Proceedings of the IEEE*, Vol. 61, No. 3, March, 1973. Reed-Solomon coding systems are discussed in the Clark, Jr. et al and Lin et al articles cited above.

The error rate performance at the output of the inner modulation code in concatenated coded systems is highly dependent on signal-to-noise ratio (SNR). Some codes perform better, providing a lower error rate at a low SNR while others perform better at a high SNR. This means that the optimization of the modulation code for concatenated and nonconcatenated coding systems can lead to different solutions, depending on the specified SNR range.

In an HDTV broadcast system, a tradeoff exists between area of coverage/station spacing and picture quality. Lower order QAM (e.g., 16-QAM) offers better area of coverage and allows closer station spacing than higher order QAM (e.g., 64-QAM), because of its lower received carrier-to-noise ratio performance characteristic. On the other hand, higher order QAM offers better picture quality than lower order QAM, because of its higher bandwidth efficiency. Which order of QAM to choose is very often affected by such things as geographical location, available/permissible transmitter power, and channel conditions. These parameters can very often be determined at the transmitter, allowing the provision of a QAM communication system in which the QAM transmission mode can be automatically selected. Such a system must, of course, also provide receivers that can automatically and reliably detect the order of QAM used by the transmitter, to enable the correct reception of transmitted signals. A system providing these features is disclosed in copending, commonly assigned U.S. patent application Ser. No. 07/852,330 filed on Mar. 24, 1992 for "Mode Selective Quadrature Amplitude Modulation Communication System" and incorporated herein by reference.

It would be advantageous to provide a data modulation system with high bandwidth efficiency and low power requirements for the communication of HDTV signals having compressed video. Such a system should provide a high data rate, with minimal bandwidth occupancy, and very high data reliability. The complexity of a receiver for use with such a system should be minimized, to provide low cost in volume production. Optimally, the system should be able to be implemented using readily available components with as little customization as possible.

The present invention provides a modulation system having the aforementioned advantages. In particular, the method and apparatus of the present invention expand a trellis coded QPSK system to a trellis coded QAM system particularly useful for HDTV communication, without sacrificing data reliability.

SUMMARY OF THE INVENTION

In accordance with the present invention, a method is provided for communicating high definition television signals. Video portions of the HDTV signals are divided into blocks of PCM video data. The blocks are processed using motion estimation and compensation to provide DPCM data. For each block, one of PCM video data and DPCM data is selected for transmission based on a predetermined criteria. For example, the alternative that produces the fewest bits for transmission may be selected. The selected data is compressed using the discrete cosine transform to provide blocks of transform coefficients, which are then quantized to improve the coding efficiency thereof. The quantized transform coefficients are then variable length coded. The resultant coefficients are coded using a concatenated coding scheme with a Reed-Solomon outer code and a trellis inner code to provide coded signals for transmission. Quadrature amplitude modulation is used to transmit the coded signals.

In a preferred embodiment, symbols produced by the Reed-Solomon outer code are interleaved, according to a first interleave format, to disperse burst errors that may be subsequently generated by the trellis inner code. The coded signals produced by the trellis inner code are interleaved according to a second interleave format, to disperse burst errors that may be subsequently generated along a transmission path for said coded signals.

In a method for decoding high definition television signals containing compressed video information and transmitted using quadrature amplitude modulation, a carrier containing said signals is received. The received carrier is demodulated to recover an interleaved modulation function containing the compressed video information. The recovered modulation function is then deinterleaved and decoded in an inner trellis decoding algorithm of a concatenated decoder to recover interleaved Reed-Solomon symbols representative of the compressed video information. The recovered Reed-Solomon symbols are deinterleaved for input to an outer Reed-Solomon decoding algorithm of the concatenated decoder. The Reed-Solomon decoding algorithm recovers variable length coded coefficients from the deinterleaved Reed-Solomon symbols. The recovered variable length coded coefficients are decoded to recover transform coefficients representative of said video information. The transform coefficients are then inverse transformed to recover video data in at least one of a PCM and DPCM format. Recovered DPCM data is processed using motion compensation to recover PCM video data represented by the recovered DPCM data, and the recovered PCM video data is formatted for output to an HDTV television receiver.

The present invention also provides a specific QAM transmission scheme for the HDTV signals. An N-point QAM constellation pattern is divided into four subsets. Each subset includes N/4 symbol points of the constellation pattern. A different two-bit codeword is assigned to each of the four subsets. A symbol to be transmitted is encoded by processing a first bit of the symbol with a rate ½ binary convolutional encoding algorithm to provide the two-bit codeword assigned to the subset in which the symbol resides in the constellation pattern. The two-bit codeword is mapped with the remaining bits of the symbol to provide a modulation function. The remaining bits correlate the symbol with one of the N/4 symbol points included in the subset defined by the codeword. A carrier is modulated with the modulation function for transmission on a communication channel.

In an illustrated embodiment, the two-bit codeword forms the least significant bits of the modulation function and defines the columns of a matrix of coordinates of the constellation pattern. The remaining bits form the most significant bits of the modulation function and determine the size of the constellation pattern. In a concatenated approach, information bits are first encoded into symbols using, for example, a t-symbol error correcting code, such as a Reed-Solomon code. These encoded symbols are then passed to a trellis encoder which produces the desired modulation for a carrier.

After the modulation function is transmitted, it is recovered at a receiver. The recovered modulation function is pruned to provide a set of metrics corresponding to the subsets and to provide a plurality of bytes representing different conditional determinations of a signal point identified by the remaining bits. The metrics are used in an algorithm (such as the Viterbi algorithm) for decoding a rate ½ binary convolutional code to recover the first bit. The recovered first bit is encoded using a rate ½ binary convolutional encoding algorithm to recreate the codeword. One of the conditional determination bytes is selected in response to the recreated codeword. The selected byte is then combined with the recovered first bit to provide a decoded output.

The present invention further provides apparatus for encoding digital data for QAM transmission. The encoder includes means for parsing a symbol to be transmitted into a first bit and at least one remaining bit. Means are provided for encoding the first bit with a rate ½ binary convolutional encoding algorithm to provide a two-bit codeword that defines one of four subsets of an N-bit QAM constellation pattern, each subset including N/4 symbol points of the constellation pattern. The codeword is mapped with the remaining bits to provide a modulation function The remaining bits correlate the symbol with one of the N/4 symbol points included in the subset defined by the codeword. Means are provided for modulating a carrier with the modulation function for transmission on a communication channel. An outer encoder can be provided for encoding information bits using an error correcting algorithm to provide the symbol that is parsed by the parsing means.

In an illustrated embodiment, the codeword forms the least significant bits of the modulation function and defines the columns of a matrix of coordinates of said constellation pattern. The remaining bits form the most significant bits of the modulation function and determine the size of the constellation pattern. The encoding means can use a trellis coding algorithm.

Decoding apparatus is also provided in accordance with the invention. A receiver demodulates a received carrier to recover an N-bit QAM modulation function in which a two-bit codeword identifies one of a plurality of QAM constellation subsets and the remaining (N-2) bit portion represents a signal point within said one subset. Means are provided for pruning the recovered modulation function to provide a set of metrics corresponding to said subsets and to provide a plurality of (N-2) bit subgroups representing a plurality of conditional determinations of the signal point identified by the (N-2) bit portion. The metrics are used in an algorithm for decoding a rate ½ binary convolutional code to recover a first bit. The recovered first bit is encoded using a rate ½ binary convolutional encoding algorithm to recreate the codeword. Means are provided for selecting one of the plurality of (N-2) bit subgroups in response to the recreated codeword. The selected subgroup is combined with the recovered first bit to provide a decoded output.

In an illustrated embodiment, the codeword comprises the least significant bits in the modulation function and defines the columns of a matrix of constellation coordinates, with the selected subgroup forming the most significant bits and defining a row of the matrix. The pruning means quantize the recovered N-bit modulation function for each column of a matrix of constellation coordinates and the conditional determinations comprise a best choice for each of the columns with the set of metrics identifying the quality of each choice. The metrics are used in conjunction with a decoder that uses a soft-decision algorithm for decoding convolutional codes.

A concatenated decoder is also provided. In the concatenated embodiment, an outer decoder is provided for decoding the output using a symbol error correcting algorithm. In an illustrated embodiment, the inner decoding algorithm used in the concatenated decoder comprises the Viterbi algorithm. The outer, symbol error correcting algorithm can comprise a Reed-Solomon code. The carrier signal received by the receiver can comprise a high definition television carrier signal.

BRIEF DESCRIPTION OF THE DRAWINGS

FIG. 4 is an illustration of a QAM constellation pattern divided into subsets in accordance with the present invention;

FIG. 5 is a diagram defining the labeling of subsets in the constellation pattern of FIG. 4;

FIG. 6 is a diagram illustrating the labeling of constellation points in the constellation pattern of FIG. 4;

FIG. 12 is a block diagram of an FEC encoder in accordance with the present invention; and FIG. 13 is a block diagram of an FEC decoder in accordance with the present invention.

DETAILED DESCRIPTION OF THE INVENTION

Figure 1:
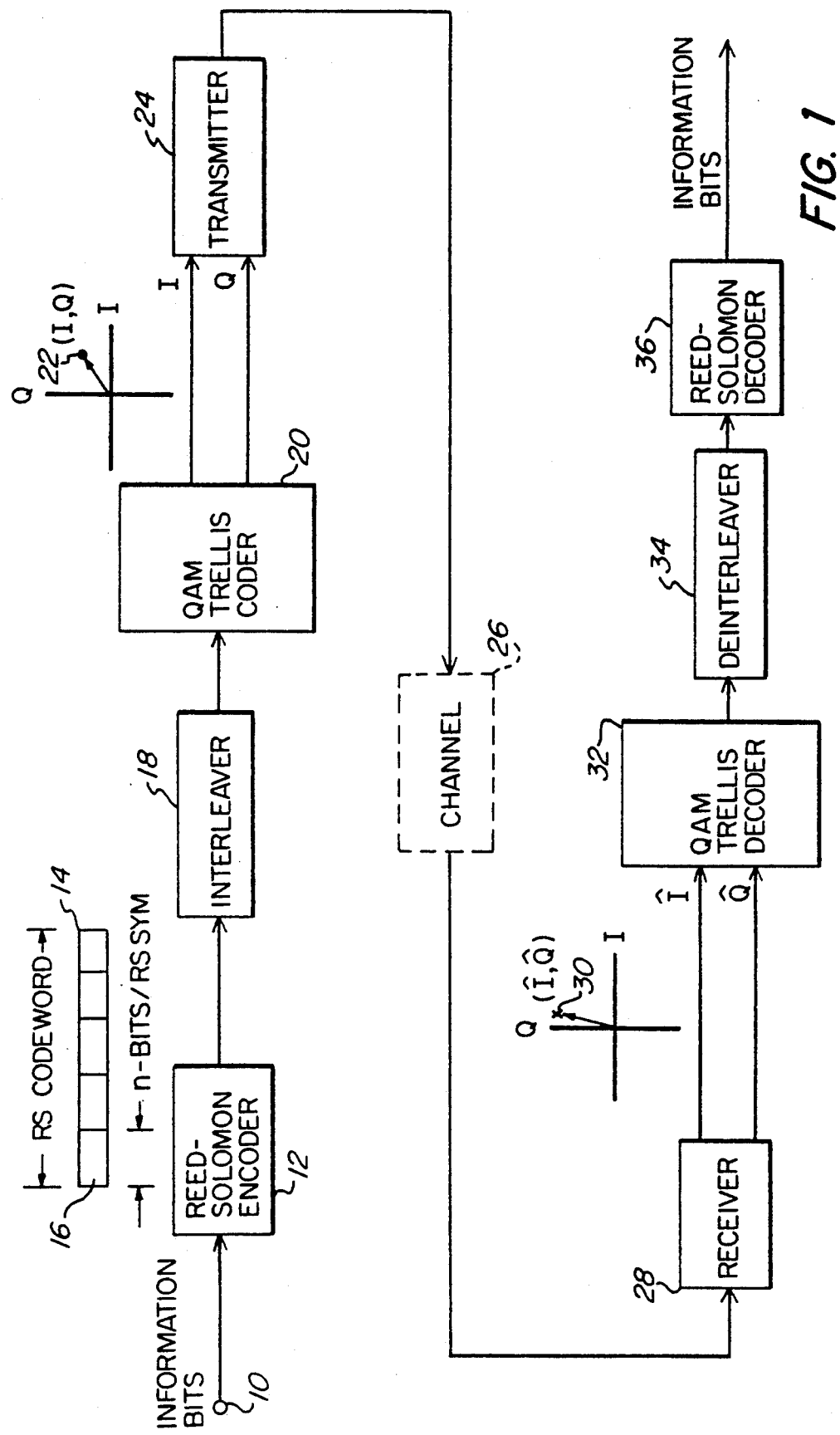
FIG. 1 is a block diagram of a QAM transmission system employing concatenated coding.

FIG. 1 illustrates a concatenated coding system for communicating QAM data. Digital information to be transmitted is input to a symbol error correcting coder 12, such as a Reed-Solomon encoder, via an input terminal 10. Encoder 12 converts the information into a codeword 14, comprising a plurality of successive n-bit symbols 16. While an outer convolutional code could be used for encoder 12, the bursty nature of the errors in a transmission system, the fact that only hard quantized data is available, and the desirability of a high rate code make a Reed-Solomon code, whose symbols are formed from n-bit segments of the binary stream, a good choice for the outer code. Since the performance of a Reed-Solomon code only depends on the number of symbol errors in the block, such a code is undisturbed by burst errors within an n-bit symbol. However, the concatenated system performance is severely degraded by long bursts of symbol errors. Therefore, an interleaver 18 is provided at the output of Reed-Solomon encoder 12, to interleave the symbols (as opposed to individual bits) between coding operations. The intent of the interleaving is to break up the bursts of symbol errors.

The interleaved symbols are input to a QAM trellis coder 20. In accordance with the present invention, coder 20 incorporates a QPSK code into a trellis coded QAM modulation system, as described in greater detail below.

The output of coder 20 comprises symbols representative of coordinates in the real (I) and imaginary (Q) planes of a QAM constellation pattern. One such constellation point 22 is symbolically illustrated in FIG. 1. The symbols are transmitted by a conventional transmitter 24 via a communication channel 26. The communication channel introduces various distortions and delays that corrupt the signal before it is received by a receiver 28. As a result, the coordinate values embodied in the received symbols will not correlate exactly with the transmitted coordinate values, such that a received point 30 will end up on the constellation pattern in a different location than the actual transmitted point 22. In order to determine the correct location for the received point, and thereby obtain the data as actually transmitted, the received data $(\hat{I}, \hat{Q})$ is input to a QAM trellis decoder 32 that uses a soft-decision convolutional decoding algorithm to recover the transmitted information. A decoder in accordance with the present invention is described in greater detail below.

The decoded output from decoder 32 is input to a deinterleaver 34 that reverses the effects of interleaver 18 discussed above. The deinterleaved data is input to a Reed-Solomon decoder 36 for recovery of the original information bits.

In the present invention, a QPSK code is incorporated into the trellis coded QAM modulation system to provide a high data rate, bandwidth efficient system with a moderate bit error rate in low SNR regions of operation. In order to achieve this result, the codewords of the QPSK code and the "uncoded" bits which together define a symbol are uniquely assigned to a QAM constellation. In addition, the received signal is decoded by a combination of a soft-decision decoder with techniques for deciding which constellation points the "uncoded" bits refer to.

Figure 2:
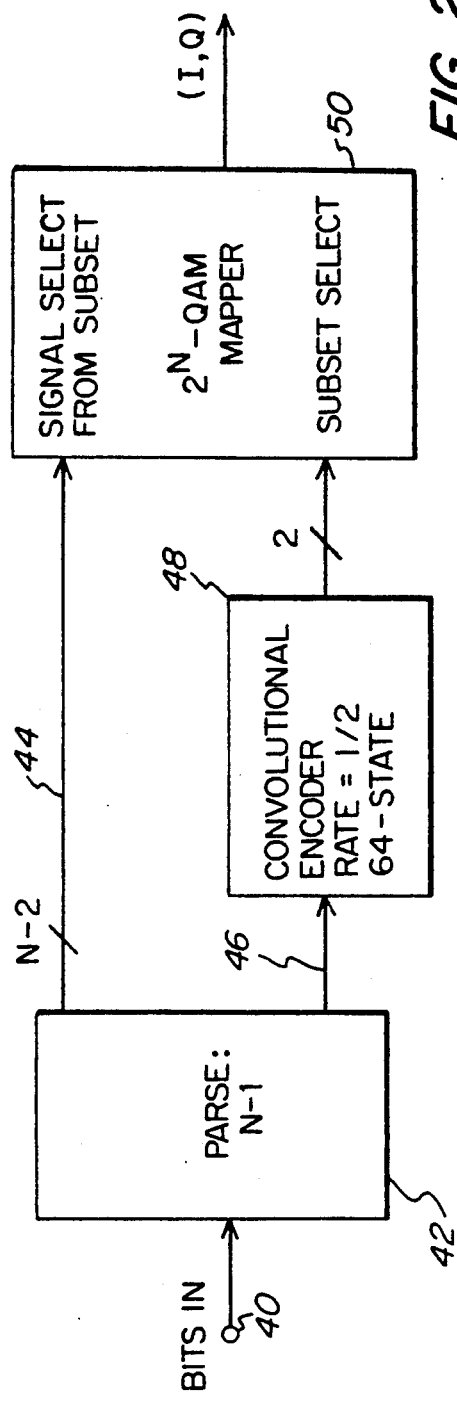
FIG. 2 is a block diagram of a trellis encoder in accordance with the present invention.

FIG. 2 illustrates an encoder in accordance with the present invention. Data bits (e.g., from interleaver 18—FIG. 1) are input to a conventional parsing circuit 42 via an input terminal 40. An N-1 bit symbol to be transmitted is parsed into a first bit that is output on line 46 to a convolutional encoder 48. The remaining N-2 "uncoded" bits are output on line 44 to a $2^N$-QAM mapper 50. Convolutional encoder 48 employs a rate $\frac{1}{2}$, 64-state convolutional code, in which the generators are 171 and 133 in octal. The two bits output from encoder 48 and the N-2 uncoded bits (N bits total) are presented to the $2^N$-QAM mapper for use as labels to map the N-bit symbol to a specific constellation point on a QAM constellation. The two "coded" bits output from convolutional encoder 48 are actually QPSK codewords, and are used to select a constellation subset. The uncoded bits are used to select a specific signal point within the constellation subset from the QAM constellation.

For purposes of QAM transmission (encoding), the codewords of the QPSK code and the remaining uncoded bits must be assigned to the QAM constellation. For this purpose, one must describe modulation function, $MOD(m) \in R^2$, $$MOD: \{0, 1\}^N \rightarrow R^2.$$

The mapping described below has the following desirable features: (1) the consequences of the 90° phase ambiguity of QAM is imposed on the QPSK codewords while the uncoded bits are invariant to the ambiguity (i.e., the 90° phase ambiguity can be dealt with in the same manner as the QPSK system) and (2) the most significant digits control the constellation size (i.e, a nested scheme for 16/32/64 - QAM).

Consider the labeling described by the following matrix, for 16-QAM ($m_5=m_4=0$) (and QPSK, $m_5=m_4=M_3=m_2=0$):

$MOD(m_5m_4m_3m_2m_1m_0)$   $m_1m_0$ $m_5m_4m_3m_2$   00   01   11   10

$$\begin{array}{c} 0000 \\ 0001 \\ 0011 \\ 0010 \end{array} \begin{pmatrix} +1, +1-1, +1-1, -1+1, -1 \\ +1, -3+3, +1-1, +3-3, -1 \\ -3, -3+3, -3+3, +3-3, +3 \\ -3, +1-1, -3+3, -1+1, +3 \end{pmatrix},$$

for 32-QAM ($m_5 = 0$) add:

$MOD(m_5m_4m_3m_2m_1m_0)$   $m_1m_0$ $m_5m_4m_3m_2$   00   01   11   10

$$\begin{array}{c} 0100 \\ 0101 \\ 0111 \\ 0110 \end{array} \begin{pmatrix} +5, -3+3, +5-5, +3-3, -5 \\ +1, +5-5, +1-1, -5+5, -1 \\ +5, +1-1, +5-5, -1+1, -5 \\ -3, +5-5, -3+3, -5+5, +3 \end{pmatrix},$$

for 64-QAM add:

$MOD(m_5m_4m_3m_2m_1m_0)$   $m_1m_0$ $m_5m_4m_3m_2$   00   01   11   10

$$\begin{array}{c} 1100 \\ 1101 \\ 1111 \\ 1110 \\ 1000 \\ 1001 \\ 1011 \\ 1010 \end{array} \begin{pmatrix} +5, +5-5, +5-5, -5+5, -5 \\ +5, -7+7, +5-5, +7-7, -5 \\ -7, -7+7, -7+7, +7-7, +7 \\ -7, +5-5, -7+7, -5+5, +7 \\ -3, -7+7, -3+3, +7-7, +3 \\ -7, +1-1, -7+7, -1+1, +7 \\ +1, -7+7, +1-1, +7-7, -1 \\ -7, -3+3, -7+7, +3-3, +7 \end{pmatrix}.$$

The outputs of the QPSK encoder form the least significant bits (LSBs), $m_1m_0$, of the modulator input, and select the column of the matrix. The most significant bits (MSBs) determine the constellation size. With no uncoded bits ($m_5=m_4=m_3=m_2=0$), QPSK is generated. With 2 uncoded bits, $m_3m_2$, 16-QAM is generated. With 3 uncoded bits, $m_4m_3m_2$, 32-QAM is generated. With 4 uncoded bits, $m_5m_4m_3m_2$, 64-QAM is generated. Furthermore, the effect of rotating the QAM constellation by 90° is to rotate the columns of the matrix,

00→01→11→10→00;

which leaves the rows invariant. This means the labeling of the uncoded bits is unaffected by 0°, 90°, 180° and 270° rotations. The handling of the 90° phase ambiguity at the receiver (decoder) is left solely to the QPSK encoder. Whatever method is used for resolving the ambiguity at the QPSK receiver can be directly incorporated into the QAM system using this labeling. For example, differential encoding of QPSK could be used if the QPSK code is itself rotationally invariant.

The labeling of a 16-QAM and 32-QAM constellation pattern in accordance with the present invention is illustrated in diagrammatic form in FIG. 4. The constellation patterns, generally designated 80, correspond to the 16-QAM and 32-QAM matrices given above. In particular, for the 16-QAM example, the 16 constellation points are provided in a dashed box 90. The constellation points are divided into four subsets indicated by tokens 82, 84, 86, 88 as shown in FIG. 5. Each subset contains four constellation points. Thus, for subset 82 designated by an open circle, four points 82a, 82b, 82c, and 82d are provided within box 90. The subset itself is defined by the two coded bits (QPSK bits) m0, m1 as indicated at 92 of FIG. 6. For the 16-QAM implementation, the specific point within each subset is identified by the "uncoded" bits m2, m3 as indicated at 94 in FIG. 6. Thus, 82c is defined as the 00 subset and the 011 point within that subset. Each remaining constellation point, such as points 84a, 86a, and 88a, are similarly identified.

For a 32-bit QAM implementation, the additional 16 points outside of dashed box 90 are also included. These points are labeled similarly, with all three bits m2, m3, m4 designated at 94 in FIG. 6 being used. It will be appreciated that the labeling set forth can be expanded to higher levels of QAM.

A feature of the labeling scheme used in accordance with the present invention, as indicated in FIG. 5, is that the Hamming weight of each QPSK symbol equals the Euclidian weight divided by a factor x, where x corresponds to the (minimum distance)$^2$ between constellation points. In the present example, the constellation points illustrated in FIG. 4 are provided at QAM levels of 1, −1, 3, −3, 5, −5 in each of the quadrature channels, and therefore the minimum distance between constellation points is two, such that the Hamming weight is equal to the Euclidian weight divided by 4.

Figure 3:
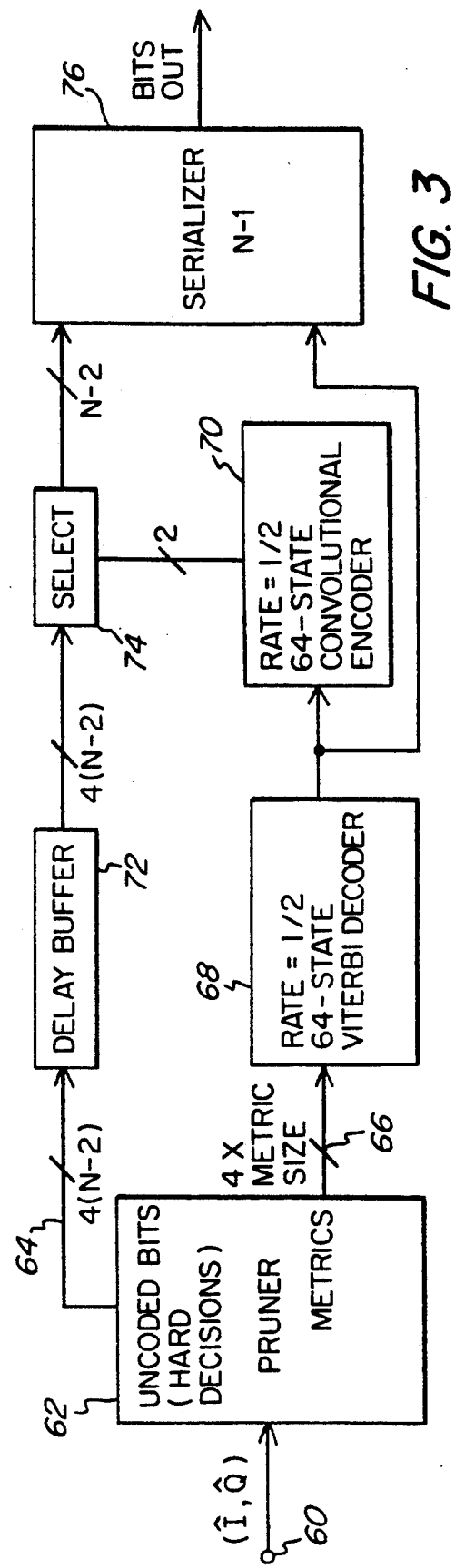
FIG. 3 is a block diagram of a trellis decoder in accordance with the present invention.

FIG. 3 illustrates an implementation of a QAM trellis decoder in accordance with the present invention. The received symbol data is input to a pruner 62 via an input terminal 60. Pruner 62 processes the recovered modulation function to provide a set of metrics corresponding to the subsets defined by the QPSK codewords, and to provide a plurality of (N-2) bit subgroups representing a plurality of conditional determinations of the signal point identified by the transmitted uncoded bits. In particular, four metrics are output on line 66 to a rate ½ 64-state Viterbi decoder 68. Four sets of (N-2) bit conditional determinations are output on line 64.

Pruner 62 can comprise a memory device, such as a programmable read only memory (PROM), that stores a look-up table containing precomputed sets of metrics and conditional determinations for different sets of input values ($\hat{I}$, $\hat{Q}$). The ($\hat{I}$, $\hat{Q}$) values are used to address the PROM to output the corresponding stored metrics and determinations. This allows a very high speed pruning operation. The Viterbi decoder uses an accumulated history of the metrics received from the pruner to decode the QPSK codewords The Viterbi decoder 68 illustrated in FIG. 3 can be a conventional rate ½ decoder that is available for use with conventional QPSK coding schemes. Thus, in order to implement the decoder of the present invention, a custom Viterbi decoder is not required to decode the trellis codes.

Consider the process of signal detection when a soft-decision QPSK decoder is incorporated in a system employing the previously described QAM modulator. First, in hard-decision detection of QPSK or QAM signals, the received signal, $y_k = x_k + w_k$, is quantized, where the signal, $x_k$, belongs to the QPSK or QAM constellation (i.e., in the range of MOD(m)) and $w_k$ is the noise. The quantization function produces an estimate of both the signal, $\hat{x}_k$, and the data $\hat{m}$, according to the relation, $\hat{x}_k = \text{MOD}(\hat{m})$. For maximum likelihood detection (ML), the log-likelihood function, $-\log(p(y_k \mid \text{MOD}(m)))$, is minimized over the possible messages, $m \in \{0, 1\}^N$, where $p(y_k \mid x_k)$ is the conditional probability of receiving $y_k$ given that $x_k$ is transmitted. For random messages, ML detection minimizes the probability of error. The most common method of quantization is nearest (Euclidean) neighbor detection, which satisfies $$||y_k - \hat{x}_k||^2 = \min_{m \in \{0,1\}^N} ||y_k - \text{MOD}(m)||^2$$

where $|.|^2$ is the Euclidean distance squared (i.e., the sum of the squares). In the case of additive Gaussian noise, nearest neighbor detection is ML.

In coded QPSK and QAM systems, soft decision information should be provided to the decoder for effective decoding of the codeword. This soft-decision information is often described as a symbol metric; this metric indicates the quality of deciding a particular symbol, $\hat{x}_k = \text{MOD}(\hat{m})$, was sent when $y_k$ is received. For nearest neighbor decoding, the metric of choice is:

$$\text{metric}(y_k; m) = |y_k - \text{MOD}(m)|^2.$$

In practice, the metric itself is quantized for purposes of implementation. In QPSK, for example, for each possible message, $m_1$, $m_0 \in \{0, 1\}^2$, the nearest neighbor metric $|y_k - \text{MOD}(m_1, m_0)|^2$ is the ML metric for additive Gaussian noise.

In trellis coded QAM modulation, based on a soft decision decodable QPSK code, four symbol metrics must be supplied to the decoder, as well as four conditional hard decisions. For nearest neighbor detection, for each choice of $m_1$, $m_0 \in \{0, 1\}^2$ $$\text{metric}(y_k; m_1, m_0) = \min_{m_{N-1}, \ldots, m_2 \in \{0, 1\}^{N-2}} ||y_k - \text{MOD}(m_{N-1}, \ldots, m_2, m_1, m_0)||^2$$

the conditional hard decisions correspond to the choice of $m_{N-1}, \ldots, m_2$ that obtain the minimum. The process of determining the symbol metrics and conditional hard decisions is known as pruning. In trellis coded QAM, the uncoded bits appear as "parallel" branches of the trellis, and the computation of the symbol metrics and conditional hard decisions act to prune all but the single best branch from the set of parallel edges.

Note that pruning is easily described in terms of the QAM modulation matrix presented above. The pruning operation simply involves quantizing the received symbol, $y_k$, for each column of the matrix. The conditional hard decision is then the best choice for each column and the metric corresponds to the quality of that decision.

Once the pruning operation has been completed, the soft decision information is presented to the decoder of the QPSK code. (During this time, the conditional hard decisions are stored waiting for the QPSK decisions.) The QPSK decoder, using the soft decision information, decodes the QPSK information (i.e., the $m_1$, $m_0$s). The remaining information (i.e., the $m_{N-1}, \ldots, m_2$s) is then decided in a well known manner using the decoded QPSK information and the previously stored conditional hard decisions.

Note that if the QPSK decoder is ML (for QPSK modulation) then the pruning/QPSK decoding method described is also ML. For example, if the QPSK code is a binary convolutional code with nearest neighbor (i.e., Viterbi) decoding, then the QAM trellis decoding algorithm is also nearest neighbor (i.e., finds the closest codeword to the received sequence).

In the embodiment illustrated in FIG. 3, the metrics output from pruner 62 are decoded by decoder 68 to recover a single bit that corresponds to the single bit output on line 46 in the encoder of FIG. 2. This bit is re-encoded with a rate ½ 64-state convolutional encoder 70 (identical to encoder 48 in FIG. 2) to recreate the two-bit QPSK codeword. The recreated codeword is used to select one of the four (N-2) bit subgroups output from the pruner, after the subgroups have been delayed by a delay buffer 72 for an amount of time equal to the delay introduced by decoder 68. The selected (N-2) bit subgroup is then combined with the recovered single bit from decoder 68 in a serializer 76, to provide a trellis decoded output.

As noted in connection with FIG. 1, the decoded output may exhibit a modest symbol error rate that must be further improved by an outer decoder. Thus, further processing of the decoded output, by deinterleaver 34 and a Reed-Solomon outer decoder 36 (FIG. 1) is used to recover the original information bits.

An estimate of the output bit error rate, with a given input symbol error rate, for a t error-correcting, Reed-Solomon code can be easily computed. An (extended) Reed-Solomon code, over the finite field with $q = 2^l$, has parameters, ($n_{RS}$, k, t), Where the blocklength, $n_{RS} \leq q+1$, the dimension, $k = n_{RS} - 2t$, and the error-correction capability is t errors. For a memoryless, symbol error channel with input symbol error rate, $p_{in}$, the output symbol error rate is bounded by:

$$P_{out} \leq (1/n_{RS}) \sum_{i=t+1}^{n_{RS}} \binom{n_{RS}}{i} (1 - P_{in})^{n_{RS}-i} P_{in}^i \min(i + t, n_{RS})$$

Then, the output bit error rate is approximated by the formula:

$$P_b \approx P_{out} 2^{l-1}/(2^l - 1)$$

Also, if the l bit symbols of the Reed-Solomon code are composed of smaller, n bit symbols (e.g., the decoded symbols of a trellis coded QAM modulation) then the input error rate is:

$$p_{in} \approx 1 - (1 - p_{mod})^{l/n}$$

where $p_{mod}$ is the n bit symbol error rate. To guarantee a "memoryless" channel when coded modulation is employed, the use of interleaving is required.

Figure 7:
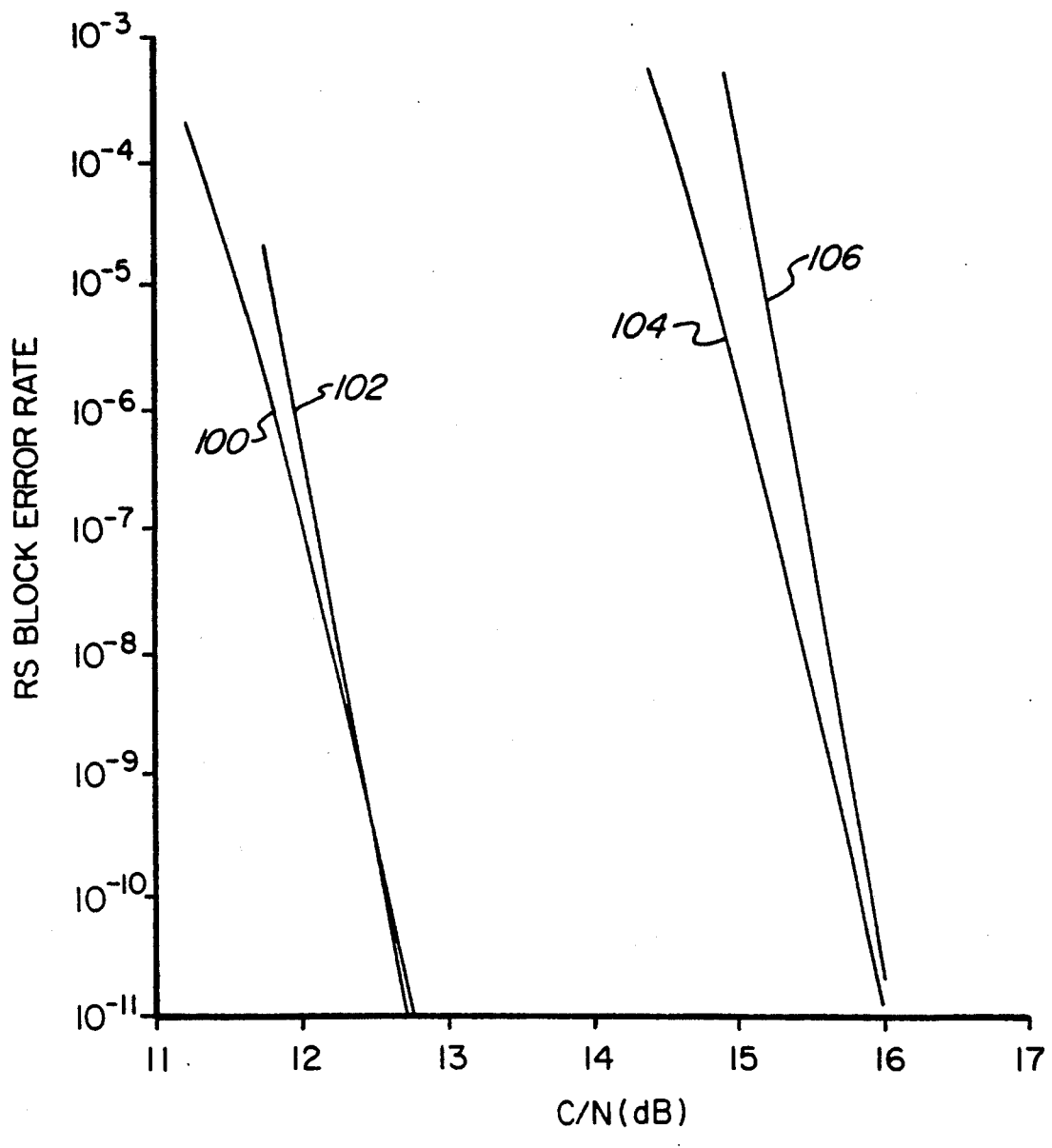
FIG. 7 is a graph illustrating the performance of a concatenated coding scheme in accordance with the present invention as compared to a prior art coded QAM scheme.

FIG. 7 illustrates the performance of two concatenated systems, one employing conventional rate ⅔ trellis codes and decoding, and the other using the rate ½

QPSK implementation of trellis coded QAM in accordance with the present invention. The graph of FIG. 7 plots Reed-Solomon block error rate against the carrier-to-noise ratio (CNR) in the received signal. A block error (or codeword error) occurs if one or more m-bit symbols are in error in the block. Curve 100 represents the performance of a concatenated Reed-Solomon trellis coded 16-QAM system in accordance with the present invention, using a rate $\frac{1}{2}$, 64-state decoder. Curve 104 represents the performance of a similar system using trellis coded 32-QAM. Curve 102 represents the performance of a conventional trellis coded 16-QAM, rate $\frac{2}{3}$, 16-state decoder. Curve 106 represents the performance of a conventional trellis coded 32-QAM rate $\frac{3}{4}$, 16-state decoder.

The curves of FIG. 7 were determined by using trellis coding simulation results to estimate the probability of an m-bit Reed-Solomon symbol being in error, $P_{RSsym}$, and then calculating the probability of a Reed-Solomon block error in accordance with the following formula:

$$P_{block} = \sum_{i=t+1}^{L} \binom{L}{i} P_{RSsym}^i (1 - P_{RSsym})^{L-i}$$

where L is the Reed-Solomon block length (number of m-bit symbols per block) and t is the number of Reed-Solomon symbol errors that can be corrected per block. The 16-QAM system uses 116, 8-bit symbols per block, and the 32-QAM system uses 155, 8-bit symbols per block. Both Reed-Solomon codes can correct up to five, 8-bit Reed-Solomon symbols per block.

The curves in FIG. 7 show that if it is desired or necessary to operate the system below a certain CNR, then the trellis coding approach of the present invention, represented by curves 100, 104, is clearly the correct choice. Even at higher CNRs, however, the trellis coding approach of the present invention may still be a better choice, because the trellis decoder apparatus can be produced in a more cost effective manner using a conventional QPSK Viterbi decoder chip.

Figure 8:
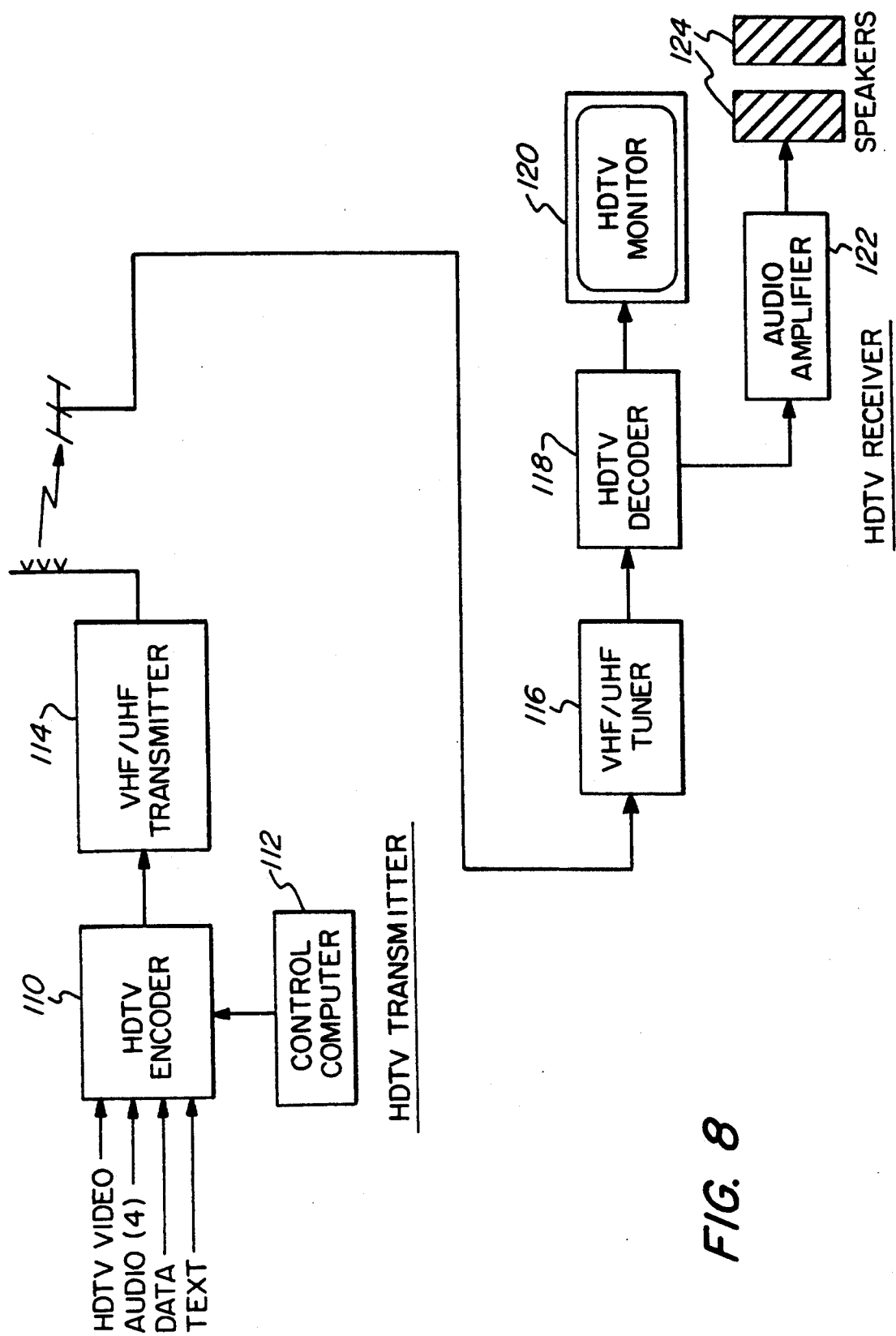
FIG. 8 is a block diagram of an HDTV communication system in accordance with the invention.

FIG. 8 illustrates the basic components of a digital HDTV communication system. An HDTV encoder 110 receives video information, audio information, data and text under the control of a control computer 112. The encoded information is transmitted using a VHF/UHF transmitter 114 which, in accordance with the present invention, modulates a radio frequency carrier using QAM. At the consumer's home, the HDTV receiver receives the QAM modulated data stream. Tuner 116 enables a viewer to select a particular program for viewing. The selected program is decoded in an HDTV decoder 118, which outputs video signals to an HDTV monitor 120 and audio signals to speakers 124 via an audio amplifier 122. Data and text can also be provided to the viewer via monitor 120. An adaptive equalizer can be provided at the receiver to combat multipath distortions common in VHF or UHF terrestrial transmission. A forward error correcting decoder described in greater detail below corrects virtually all random or burst errors in the received signal.

Figure 9:
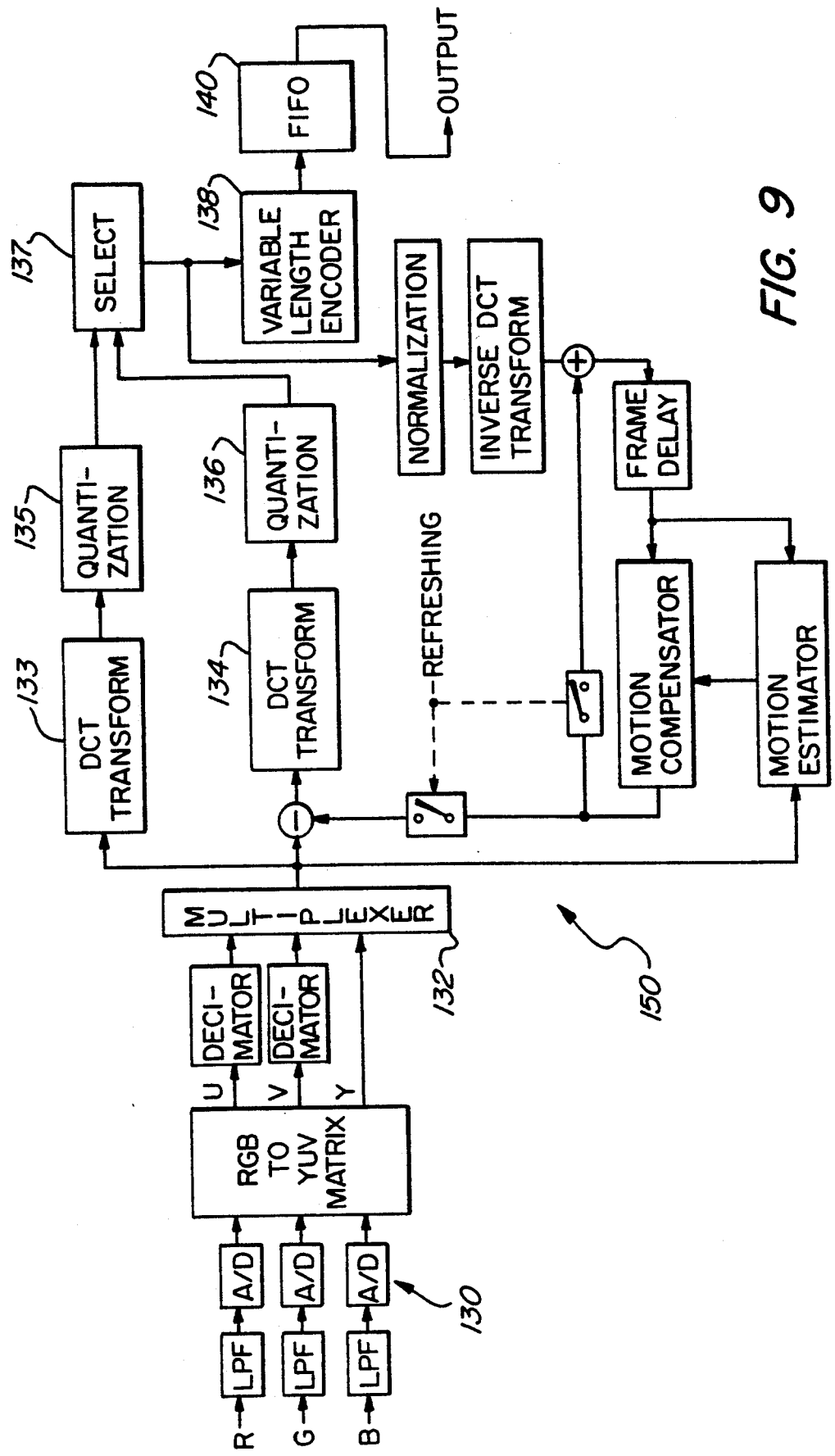
FIG. 9 is a block diagram of a digital video encoder for use in the system of FIG. 8.

FIG. 9 is a block diagram of a digital video encoder that can be used to encode the video portions of HDTV signals prior to transmission. The analog red, green and blue (R, G, B) inputs from a video source are processed in a front end generally designated 130. The R,G,B inputs are low pass filtered and clamped before they are digitized. The low pass filters are designed to provide adequate rejection of aliasing components and other spurious signals. The clamping restores proper DC-levels during the horizontal blanking interval.

After analog to digital conversion, the R,G,B signal is converted into the YUV color space. The resolution of chrominance information can be reduced relative to luminance resolution with only a slight effect on the perceived image quality. The U and V chrominance components are decimated horizontally by a factor of 4 and vertically by a factor of 2.

Horizontal decimation can be performed, for example, by applying a digital FIR filter prior to subsampling. Horizontal interpolation is performed at a decoder by zero padding and applying the same filtering with the gain increased by a factor of 4. Vertical decimation by a factor of 2 is performed by discarding one of every two fields. The decoder reconstructs the interlaced signal by repeating each chrominance field twice. Although the vertical decimation across two different fields results in some degradation in motion rendition, this degradation is difficult to detect and does not present a significant problem.

The luminance signal (Y) bypasses the chrominance preprocessor. Thus, full resolution is maintained. The chrominance components are then multiplexed with the luminance component, one video block at a time, in a multiplexer 132. All components are then subjected to the same compression processing At the decoder, the components are again separated and the chrominance signals are interpolated back to full resolution.

The video signals are compressed in two different paths using the discrete cosine transform (DCT). In a first "PCM" path, the video is DCT transformed at 133, and the resultant coefficients are quantized in a quantizer 135. In a second "DPCM" path, in which motion estimation and compensation is used to provide difference signals based on a prediction of how a video frame will appear, the difference between the prediction and the actual image is DCT transformed at 134. The resultant DCT transform coefficients are quantized in a quantizer 136 and output to a selector 137 that selects quantized coefficients from either the PCM or DPCM path depending on a predetermined criterion, such as which path produced the fewest number of bits. The selected coefficients for each block of video data are input to a variable length encoder 138 which can comprise, for example, a conventional Huffman coder. The variable length codewords are output to a first-in first-out register 140 for output to a transmitter.

The DCT transforms a block of pixels into a new block of transform coefficients. In a preferred embodiment, a block size of 8×8 is used because the efficiency of the transform coding does not improve much while the complexity grows substantially beyond this size. The transform is applied in turn to each such block until an entire image has been transformed. At the decoder, the inverse transformation is applied to recover the original image.

There are instances when the DCT is not effective in compacting the energy into a small number of coefficients. For example, if the input signal is white noise, then the image energy is no less randomly distributed after transformation than it was in the pixel domain. Under such conditions, the image becomes much more difficult to compress and indeed, cannot be compressed without introducing artifacts of some form or another.

Fortunately, under such conditions, artifacts tend to be much less conspicuous than they would be under more quiet conditions. Also, such conditions are not typical of television video, wherein a high degree of horizontal and vertical correlation usually exists among adjacent pixels.

The video compression techniques used in the system of the present invention are very effective in reducing the number of bits required to represent the DCT coefficients. These techniques include coefficient quantization, variable length encoding, motion estimation and compensation, integration of motion compensation with intraframe coding, and adaptive field/frame encoding. The techniques of motion estimation and compensation and the integration of motion compensation with intraframe coding are described more fully in U.S. Pat. No. 5,068,724 issued on Nov. 26, 1991 for "Adaptive Motion Compensation for Digital Television," incorporated herein by reference. Circuitry 150 for performing these functions is illustrated in FIG. 9.

Adaptive field/frame encoding is disclosed in U.S. Pat. No. 5,091,782 issued on Feb. 25, 1992 for "Apparatus and Method for Adaptively Compressing Successive Blocks of Digital Video," incorporated herein by reference. U.S. Pat. Nos. 5,093,720 issued on Mar. 3, 1992 for "Motion Compensation for Interlaced Digital Television Signals" and 5,057,916 issued on Oct. 15, 1991 for "Method and Apparatus for Refreshing Motion Compensated Sequential Video Images," both incorporated herein by reference, disclose additional motion compensation techniques useful in carrying out an HDTV communication system such as the system of the present invention.

Coefficient quantization is a process that introduces small changes into the image in order to improve coding efficiency. This is accomplished by first weighing each of the DCT coefficients and then selecting 8 bits for transmission to the decoder. Once assigned, the weights for each coefficient are fixed and never changed. Thus, for example, each coefficient can initially be represented as a 12 bit number which is then divided by the respective weighting factor. However, additional scaling may still be necessary to achieve a desired data rate. Therefore, the weighted coefficients are divided by a quantization factor. The quantization factor is determined by a quantization level that is periodically adjusted based on scene complexity and perceptual characteristics. In a preferred embodiment of the invention, the quantization level ranges from 0 to 31. Maximum precision occurs at quantization level 0 and minimum precision occurs at level 30. Level 31 is reserved and indicates to the decoder that no data will be transmitted.

After a 12 bit DCT coefficient is scaled by both the weighting factor and the quantization factor, the eight least significant bits are selected. In almost all cases, the four most significant bits will be zero and therefore no information is lost. However, in some cases where both the weighting and quantization factors are small, it may be necessary to clip the resulting coefficient in order to prevent an overflow or underflow from occurring.

The quantization method set forth above does not apply to the DC coefficient. The eight most significant bits of the DC coefficient are always selected, independent of the quantization level.

Quantization improves the compressibility of an image by reducing the amplitude of the transform coefficients. In order to take advantage of the result, an algorithm for assigning a variable number of bits to these coefficients is required. The variable length encoder uses a statistical coding technique which, unlike the quantization process, is information preserving so that it will not degrade the image.

In a preferred embodiment of the present invention, Huffman coding is used for the variable length encoding. Huffman coding is a well known optimum statistical coding procedure capable of approaching the theoretical entropy limit, giving a priori knowledge of the probability of all possible events. The encoder can generate such probability distributions and send them to the decoder prior to the transmission of a given frame. This table is then used to derive Huffman codewords where relatively short codewords are assigned to events with the highest probability of occurrence. The decoder maintains an identical code book and is able to match each codeword with the actual event. For hardware simplicity, it is advantageous to use a fixed Huffman table that is generated based on a wide variety of materials processed. Huffman coding is described in greater detail in the aforementioned article to W. Paik entitled "DigiCipher—All Digital, Channel Compatible, HDTV Broadcast System."

The motion estimation and compensation subsystem 150 of the present invention compresses the video information by first predicting how the next frame will appear and then sending the difference between the prediction and the actual image. A reasonable predictor is simply the previous frame. This sort of temporal differential encoding (DPCM) will perform very well if little movement occurs of if there is little spatial detail. At other times, it will be less effective and occasionally worse than if the next frame had simply been encoded without prediction (PCM).

Motion compensation is a means of improving the performance of any temporal compression scheme when movement occurs. In order to apply motion compensation, it is first necessary to determine what has moved since the previous frame and where it has moved to. If this information is known at the decoder site, then the previous frame can be shifted or displaced in order to obtain a more accurate prediction of the next frame that has yet to be transmitted. The encoder would reproduce the same prediction as the decoder and then determine the difference between the prediction and the actual image. If the movements match the model used to estimate motion and if the motion estimates are accurate and the signal is free of noise, then this error would, in fact, be zero.

Displacement of the previous frame can be performed on a frame, partial frame, or pixel basis. That is, a unique displacement (motion vector) can be generated for every frame, part of a frame, or every pixel respectively. The usefulness of generating a single motion vector per frame, however, is limited since it can only model simple panning of the entire image. Ideally, a unique motion vector would be generated for each pixel. However, since motion estimation is a complex process and requires knowledge of the next frame, it can only be performed at the encoder, and the overhead involved in making per-pixel motion information available to the decoder would be excessive. Therefore, it is preferable to perform motion estimation on a partial frame basis with the area of the portion chosen equal to a "superblock" having a horizontal dimension equal to four DCT blocks and a vertical dimension equal to two DCT blocks. This sizing is compatible with the four times horizontal subsampling and two times vertical subsampling of the chrominance components, thus allowing the same motion vector to be used to displace a single chrominance DCT block.

Figure 10:
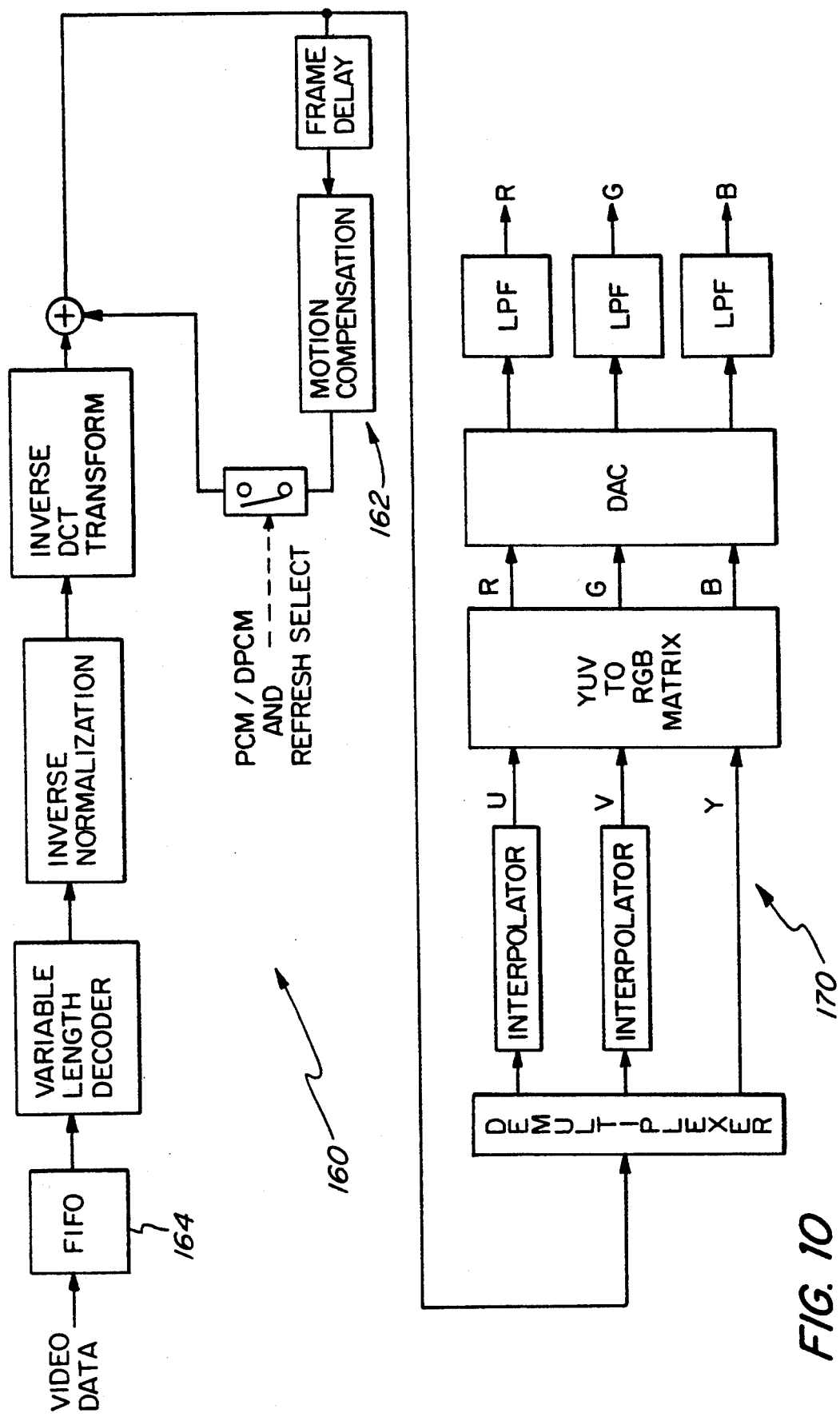
FIG. 10 is a block diagram of a digital video decoder for use in the system of FIG. 8.

As shown in the encoder block diagram of FIG. 9, motion compensation circuitry 150 is coupled in a feedback arrangement from the output of selector 137 to the input of DCT transform 134. Similarly, motion compensation 162 in decoder 160 (FIG. 10) is provided at the output of the inverse DCT transform. Instead of transform coding the image directly, an estimate of the image is first generated using motion compensation. The difference between this estimate and the actual image is then transform coded and the transform coefficients are normalized and statistically coded. The second of the two frames from which the motion estimates are derived is always the previous frame as it appears after reconstruction by the decoder. Therefore, the encoder includes a model of the decoder processing, i.e., a frame delay and motion compensator comparable to those components 162 in the decoder.

As noted above, a lower bit rate is occasionally possible by direct PCM coding of a block instead of using motion compensation and coding the differences Thus, to obtain the lowest possible bit rate, the encoder determines the number of bits required for each of the two methods and then selects the method requiring the fewest bits, on a per block basis The overhead required to inform the decoder of the selection is one bit per block.

It should be appreciated that in an HDTV transmission system, a plurality of different television program channels will be multiplexed for transmission together in a common data stream. Each single channel video processing section in the encoder requires a rate buffer in order to match the variable rate of the Huffman coded data to the fixed output rate necessary for channel transmission. This rate buffer can be implemented as a one frame FIFO 140 as illustrated in FIG. 9. The total storage size of the FIFO is large enough to handle variations of plus and minus one video field.

In order to prevent the video output buffer FIFO from overflowing or underflowing, the FIFO input block rate must be continuously adjusted. This is accomplished using a multi-quantization level coding structure. As the quantization level is incremented, quantization becomes coarser, blocks are shortened, and an increase in the FIFO input block rate results. As the quantization level is decremented to a minimum level of zero, finer quantization results in longer blocks, and a reduced FIFO input block rate. This adjustment has the required effect of keeping the bit rate into the FIFO relatively constant. The status of the buffer is continuously monitored, and as long as the number of stored blocks remains within a predetermined window, the quantization level will remain unchanged. If the buffer level drops below the lower threshold or rises above the higher threshold, then the quantization level will decrement or increment respectively. In order to prevent underflows during the transmission of very simple images, fill bits can be inserted into the channel. A corresponding FIFO 164 is provided in the decoder (FIG. 10) prior to the variable length decoder. The decoder also includes a chrominance processor generally designated 170 to reproduce the necessary RGB outputs.

Figure 11:
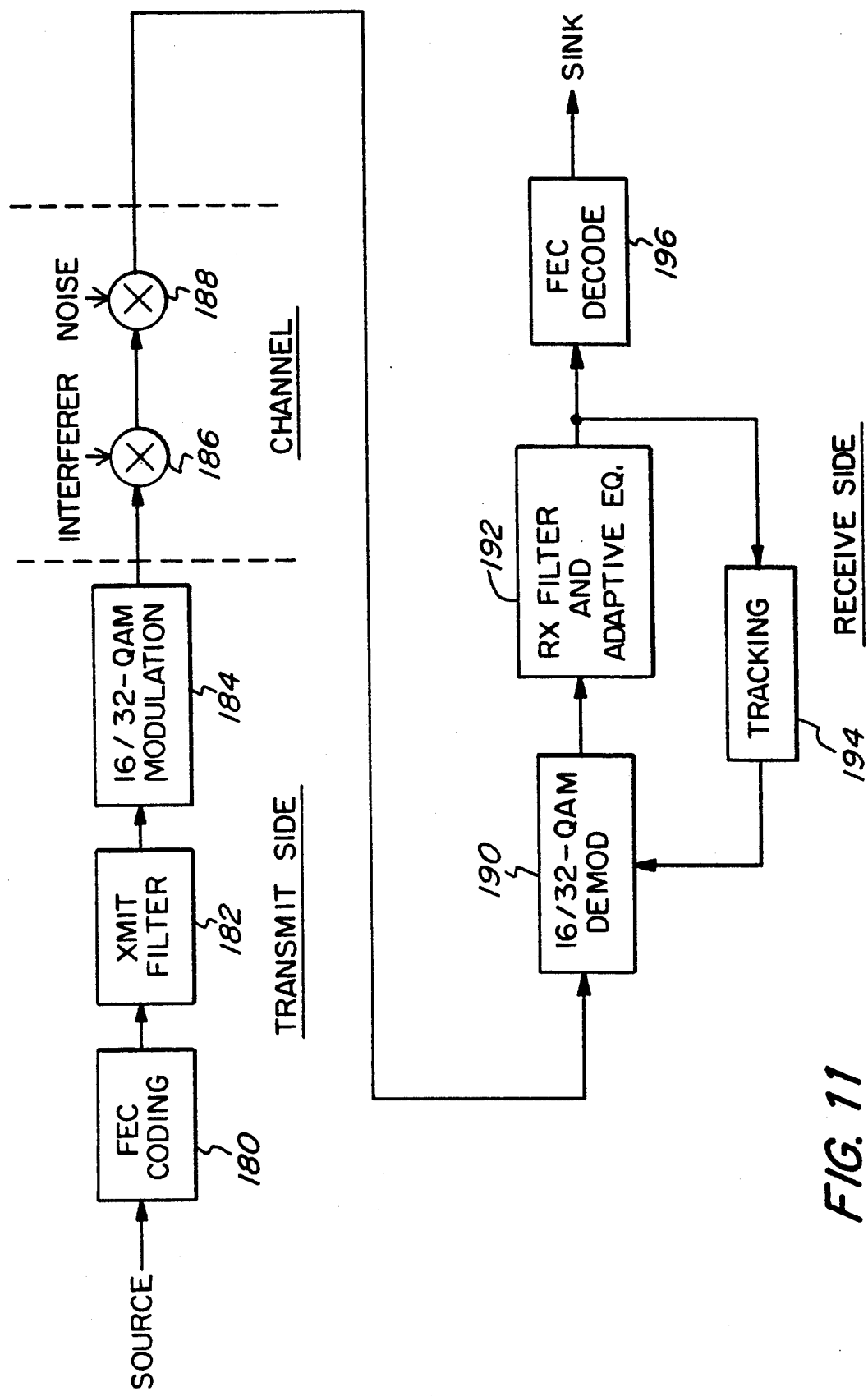
FIG. 11 is a block diagram of a transmission system including forward error correction (FEC) coding and QAM modulation and demodulation in accordance with the invention.

FIG. 11 illustrates the basic communication system blocks used to transmit the compressed video data. These include FEC coding 180, a transmission filter 182, and QAM modulation at the transmit side. Interference and noise introduced by the communication channel are depicted at 186, 188 respectively. A demodulator 190, receiver filter and adaptive equalizer 192, tracking subsystem 194, and FEC decoder 196 are provided at the receive side. Filters 182 and 192 are used for pulse shaping. Adaptive equalization is employed to handle the reflections (multipath) found in typical VHF or UHF reception.

The concatenated trellis coding and block coding scheme described in detail above is used to protect against the effect of channel errors. A specific embodiment of an FEC encoder that uses two separate interleavers is illustrated in FIG. 12. A corresponding embodiment of an FEC decoder is illustrated in FIG. 13. As shown, the FEC encoder includes a Reed-Solomon encoder 200 followed by a first interleaver 202 that interleaves symbols produced by the Reed-Solomon outer code according to a first interleave format. The interleaving has the effect of dispersing burst errors that may be subsequently generated by the trellis inner code. Trellis encoder 204 outputs the I and Q signal components to a second interleaver 206 that interleaves the coded signals produced by the trellis inner code according to a second interleave format. This has the effect of dispersing burst errors that may be subsequently generated along a transmission path for the coded signals.

At the decoder, the coded signals are processed by a deinterleaver 210 and output to a trellis decoder 212 for recovering interleaved Reed-Solomon symbols representative of the compressed video information. Trellis decoder 212 (e.g., rate ⅔ for 16 QAM and rate 4/5 for 32 QAM) is used for the inner code, since it supports the use of soft decisions easily. The Reed-Solomon symbols recovered by the trellis decoder are deinterleaved in another deinterleaver 214 for input to Reed-Solomon decoder 216.

Reed-Solomon decoder 216 (e.g., rate 106/116, t=5 for 16 QAM and rate 145/155, t=5 for 32 QAM) is used for the outer code, since its built-in burst error correcting capability can handle burst errors produced by the trellis decoder.

An adaptive equalizer using, e.g., the least mean square (LMS) algorithm can be provided at the receiver. Such an equalizer can be constructed using a 256 tap complex FIR (finite impulse response) filter that has its coefficients constantly adjusted to optimize the signal constellation for the soft decision in the presence of noise, multipath, and interference. The adaptive equalizer can be designed to automatically notch filtering at visual, color and audio carrier frequencies of an interfering NTSC signal to improve NTSC interference rejection.

It should now be appreciated that the present invention provides a practical system for digital transmission of power and band limited signals, such as compressed high definition television signals. A coded modulation scheme based on codes for QPSK modulation is directly incorporated into a QAM based modulation system, forming trellis coded QAM. This provides an easily implementable structure that is both efficient in bandwidth and data reliability.

Although the invention has been described in connection with specific embodiments thereof, those skilled in the art will appreciate that numerous adaptations and modifications may be made thereto without departing from the spirit and scope of the invention as set forth in the claims.

We claim:

1. A method for communicating digital television signals comprising the steps of:
   dividing video portions of said digital television signals into blocks of pulse code modulated (PCM) video data;
   processing said blocks of PCM video data using motion estimation and compensation to provide corresponding differential pulse code modulated (DPCM) data;
   selecting either the PCM video data or the corresponding DPCM data for transmission based on a predetermined criterion;
   compressing the selected data using the discrete cosine transform to provide blocks of transform coefficients;
   quantizing the transform coefficients in said blocks of transform coefficients to improve the coding efficiency thereof;
   variable length coding said quantized transform coefficients;
   coding said variable length coded quantized transform coefficients using a concatenated coding scheme with a Reed-Solomon outer code and a trellis inner code to provide coded signals for transmission;
   transmitting said coded signals as quadrature amplitude modulation (QAM) symbols from an N-point QAM constellation pattern having four subsets, each subset being identified by a different two-bit codeword and including N/4 symbol points of said N-point QAM constellation pattern;
   wherein said trellis inner code encodes a symbol from said Reed-Solomon outer code by processing a first bit of said symbol with a rate $\frac{1}{2}$ binary convolutional encoding algorithm to provide the two-bit codeword assigned to the subset in which said symbol resides in said N-point QAM constellation pattern, and said two-bit codeword is mapped with remaining bits of said symbol to provide a modulation function for transmission on a carrier, said remaining bits correlating said symbol with one of the N/4 symbol points included in the subset defined by said two-bit codeword;
   receiving said carrier at a receiver;
   demodulating the received carrier at said receiver to recover said modulation function;
   providing, form the recovered modulation function, a set of metrics corresponding to said subsets and a plurality of bytes representing different conditional determinations of a signal point identified by the remaining bits;
   using said metrics in a trellis code algorithm for decoding a rate $\frac{1}{2}$ binary convolutional code to recover said first bit;
   encoding the recovered first bit using a rate $\frac{1}{2}$ binary convolutional encoding algorithm to recreate said two-bit codeword;
   selecting one of said conditional determination bytes in response to said recreated two-bit codeword; and
   combining said selected byte with the recovered first bit to provide a decoded output.

2. A method in accordance with claim 1 wherein said concatenated coding scheme includes the steps of:
   interleaving symbols produced by said Reed-Solomon outer code, according to a first interleave format, to disperse burst errors that may be subsequently generated by the trellis inner code; and
   interleaving the coded signals produced by said trellis inner code, according to a second interleave format, to disperse burst errors that may be subsequently generated along a transmission path for said coded signals.

3. A method in accordance with claim 1 wherein:
   said two-bit codeword forms the least significant bits of said modulation function; and
   said remaining bits form the most significant bits of said modulation function.

4. A method in accordance with claim 2 further comprising the steps of:
   deinterleaving the recovered modulation function using the converse of the second interleave format;
   deinterleaving the decoded output using the converse of the first interleave format; and
   decoding the deinterleaved decoded output using a Reed-Solomon symbol error correcting decoding algorithm.

5. A method in accordance with claim 4 wherein said Reed-Solomon decoding algorithm recovers variable length coded coefficients from the deinterleaved decoded output, said method further comprising the steps of:
   decoding said recovered variable length coded coefficients to recover transform coefficients representative of said video portions;
   inverse transforming the recovered transform coefficients to recover video data in or DPCM format;
   processing recovered DPCM data using motion compensation to recover PCM video data represented by the recovered DPCM data; and
   formatting the recovered PCM video data for output to a digital television receiver.

6. A method for decoding digital television signals containing compressed video information and transmitted using quadrature amplitude modulation, comprising the steps of:
   receiving a carrier containing said digital television signals;
   demodulating the received carrier to recover an interleaved modulation function containing said compressed video information;
   deinterleaving the recovered modulation function;
   decoding the deinterleaved modulation function in an inner trellis decoding algorithm of a concatenated decoder to recover interleaved Reed-Solomon symbols representative of the compressed video information;
   deinterleaving the recovered Reed-Solomon symbols for input to an outer Reed-Solomon decoding algorithm of said concatenated decoder, said Reed-Solomon decoding algorithm recovering variable length coded coefficients from the deinterleaved Reed-Solomon symbols;
   decoding said recovered variable length coded coefficients to recover transform coefficients representative of said compressed video information;
   inverse transforming the transform coefficients to recover video data in a pulse code modulated (PCM) or differential pulse code modulated (DPCM) format;
   processing recovered DPCM data using motion compensation to recover PCM video data represented by the recovered DPCM data; and
   formatting the recovered PCM video data for output to a digital television receiver, wherein said modulation function comprises an N-bit QAM modulation function in which a two-bit codeword identifies one of a plurality of QAM constellation subsets and the remaining N-2 bit portion represents a signal point within said one subset, said method further comprising the steps of:

pruning the recovered modulation function to provide a set of metrics corresponding to said subsets and to provide a plurality of N-2 bit subgroups representing a plurality of conditional determinations of the signal point identified by the N-2bit portion;

using said metrics in said trellis decoding algorithm to decode a rate $\frac{1}{2}$ binary convolutional code to recover a first bit;

encoding the recovered first bit using a rate $\frac{1}{2}$ binary convolutional encoding algorithm to recreate said two-bit codeword;

selecting one of said plurality of N-2 bit subgroups in response to said recreated two-bit codeword; and combining the selected subgroup with the recovered first bit to provide a Reed-Solomon symbol.

7. A method in accordance with claim 6 wherein:
said two-bit codeword forms the least significant bits of said modulation function; and
said remaining bits form the most significant bits of said modulation function.

8. Apparatus for communicating digital television signals comprising:

means for processing blocks of pulse code modulated (PCM) video data using motion estimation and compensation to provide corresponding differential pulse code modulated (DPCM) data;

means for comparing said PCM video data to the corresponding DPCM data provided by said processing means and for selecting one of PCM video data or DPCM data for transmission based on a predetermined criterion;

means for compressing the selected data using the discrete cosine transform to provide blocks of transform coefficients;

means for quantizing said blocks of transform coefficients to improve the coding efficiency thereof;

means coupled to an output of said quantizing means for variable length coding said transform coefficients;

a concatenated coder including a Reed-Solomon outer coder and a trellis inner coder for coding said variable length coded transform coefficients to provide coded signals for transmission; and means for transmitting said coded signals as quadrature amplitude modulation (QAM) symbols from an N-point QAM constellation pattern having four subsets, each subset being identified by a different two-bit codeword and including N/4 symbol points of said N-point QAM constellation pattern;

wherein said trellis inner coder encodes symbol from said Reed-Solomon outer coder by processing a first bit of said symbol with a rate $\frac{1}{2}$ binary convolutional encoding algorithm to provide the two-bit codeword assigned to the subset in which said symbol resides in said constellation pattern;

said two-bit codeword is mapped with remaining bits of said symbol to provide a modulation function, said remaining bits correlating said symbol with one of the N/4 symbol points included in the subset defined by said two-bit codeword; and said transmitting means modulate said modulation function onto a carrier, said apparatus further comprising:

means for receiving said carrier at a receiver;

means for demodulating said received carrier to recover said modulation function;

means for pruning the modulation function to provide a set of metrics corresponding to said subsets and to provide a plurality of bytes representing different conditional determinations of a signal point identified by the remaining bits;

trellis decoder means coupled to receive said metrics for use in decoding a rate $\frac{1}{2}$ binary convolutional code to recover said first bit;

means for encoding the recovered first bit using a rate $\frac{1}{2}$ binary convolutional encoding algorithm to recreate said two-bit codeword;

means for selecting one of said conditional determination bytes in response to said recreated two-bit codeword; and means for combining said selected byte with the recovered first bit to provide a decoded output.

9. Apparatus in accordance with claim 8 wherein said concatenated coder comprises:

a first interleaver for interleaving symbols produced by said Reed-Solomon outer code in accordance with a first interleave format, to disperse burst errors that may be subsequently generated by the trellis inner code; and a second interleaver for interleaving the coded signals produced by said trellis inner code in accordance with a second interleave format, to disperse burst errors that may be subsequently generated along a transmission path for said coded signals.

10. Apparatus in accordance with claim 8 wherein:
said two-bit codeword forms the least significant bits of said modulation function; and
said remaining bits form the most significant bits of said modulation function.

11. Apparatus in accordance with claim 9 further comprising:

means for deinterleaving the recovered modulation function using the converse of the second interleave format;

means for deinterleaving the decoded output using the converse of the first interleave format; and means for decoding the deinterleaved decoded output using a Reed-Solomon symbol error correcting decoding algorithm.

12. Apparatus in accordance with claim 11 wherein said means for decoding using the Reed-Solomon decoding algorithm recovers variable length coded coefficients from the deinterleaved decoded output, said apparatus further comprising:

means for decoding said recovered variable length coded coefficients to recover transform coefficients;

means for inverse transforming the recovered transform coefficients to recover video data in at least one of a PCM or DPCM format;

means for processing recovered DPCM data using motion compensation to recover PCM video data represented by the recovered DPCM data; and means for formatting the recovered PCM video data for output to a digital television receiver.

13. Apparatus for decoding digital television signals containing compressed video information and transmitted using quadrature amplitude modulation (QAM), comprising:

means for receiving said digital television signals;

a QAM demodulator for demodulating a carrier containing said digital television signals to recover an interleaved modulation function containing said compressed video information;

a first deinterleaver for deinterleaving the recovered modulation function;

a concatenated decoder for decoding the deinterleaved modulation function using an inner trellis decoder to recover interleaved Reed-Solomon symbols representative of the compressed video information;

a second deinterleaver for deinterleaving the recovered Reed-Solomon symbols for input to an outer Reed-Solomon decoder of said concatenated decoder, said Reed-Solomon decoder recovering variable length coded coefficients form the deinterleaved Reed-Solomon symbols;

means for decoding said recovered variable length coded coefficients to recover transform coefficients representative of said compressed video information;

means for inverse transforming the recovered transform coefficients to recover video data in a pulse code modulated (PCM) or differential pulse code modulated (DPCM) format;

means for processing recovered DPCM data using motion compensation to recover PCM video data represented by the recovered DPCM data; and means for formatting recovered PCM video data for output to a digital television receiver;

wherein said modulation function comprises an N-bit QAM modulation function in which a two-bit codeword identifies one of a plurality of QAM constellation subsets and the remaining N-2 bit portion represents a signal point within said one subset, said apparatus further comprising:

means for pruning the recovered modulation function to provide a set of metrics corresponding to said QAM constellation subsets and to provide a plurality of N-2 bit subgroups representing a plurality of conditional determinations of the signal point identified by the N-2 bit portion;

said concatenated decoder being coupled to receive said set of metrics for use in said trellis decoder to decode a rate ½ binary convolutional code to recover a first bit;

means for encoding the recovered first bit using a rate ½ binary convolutional encoding algorithm to recreate said two-bit codeword;

means for selecting one of said plurality of N-2 bit subgroups in response to said recreated two-bit codeword; and means for combining the selected subgroup with the recovered first bit to provide a Reed-Solomon symbol.

14. Apparatus in accordance with claim 13 further comprising:

an adaptive equalizer coupled between said QAM demodulator and said concatenated decoder.

15. Apparatus for decoding transmitted digital signals to recover information therefrom, comprising:

means for receiving a carrier containing said transmitted digital signals;

a demodulator coupled to said receiving means for demodulating the received to recover a modulation function;

a concatenated decoder comprising an inner trellis decoder and an outer Reed-Solomon decoder for decoding the modulation function, said inner trellis decoder recovering Reed-Solomon symbols representative of said information and said outer Reed-Solomon decoder recovering variable length codes from the Reed-Solomon symbols; and means for decoding said recovered variable length codes to recover said information; wherein:

said modulation function is an N-bit modulation function in which a two-bit codeword identifies one of a plurality of constellation subsets and the remaining N-2 bit portion represents a signal point within said one subset; and said concatenated decoder comprises:

means for pruning the recovered modulation function to provide a set of metrics corresponding to said constellation subsets and to provide a plurality of N-2 bit subgroups representing a plurality of conditional determinations of the signal point identified by the N-2 bit portion, said inner trellis decoder using said st of metrics to decode a rate ½ binary convolutional code to recover a first bit;

means for encoding the recovered first bit using a rate ½ binary convolutional encoding algorithm to recreate said two-bit codeword;

means for selecting one of said plurality of N-2 bit subgroups in response to said recreated two-bit codeword; and means for combining the selected subgroup with the recovered first bit to provide a Reed-Solomon symbol.

16. Apparatus in accordance with claim 15 further comprising:

a first deinterleaver for deinterleaving the recovered Reed-Solomon symbols for input to said outer Reed-Solomon decoder.

17. Apparatus in accordance with claim 16 wherein said information comprises video information.

* * * * *

UNITED STATES PATENT AND TRADEMARK OFFICE
CERTIFICATE OF CORRECTION

PATENT NO. : 5,321,725
DATED : June 14, 1994
INVENTOR(S) : Paik, et al.

It is certified that error appears in the above-identified patent and that said Letters Patent is hereby corrected as shown below: On the Title page, item [54] and col. 1, line 3, The word "TREILLIS" in the title of the patent should read -- TRELLIS -- .

Claim 1, column 19, line 47, change "form" to -- from -- .
Claim 5, column 20, line 29, after "in" insert -- PCM -- .
Claim 6, column 21, line 11, insert a space between "N-2" and "bit".
Claim 8, column 21, line 58, insert -- a -- after "encodes".
Claim 13, column 23, line 21, change "form" to -- from -- .
Claim 15, column 24, line 16, insert -- carrier -- after "received".
Claim 15, column 24, line 39, change "st" to -- set -- .

Signed and Sealed this

Twentieth Day of September, 1994

Attest:

BRUCE LEHMAN

Attesting Officer

Commissioner of Patents and Trademarks